United States Patent [19]

Iwamatsu

[11] Patent Number: 5,027,687
[45] Date of Patent: Jul. 2, 1991

[54] SOUND FIELD CONTROL DEVICE

[75] Inventor: Masayuki Iwamatsu, Hamamatsu, Japan

[73] Assignee: Yamaha Corporation, Hamamatsu, Japan

[21] Appl. No.: 418,900

[22] Filed: Oct. 5, 1989

Related U.S. Application Data

[63] Continuation of Ser. No. 147,707, Jan. 25, 1988, abandoned.

[30] Foreign Application Priority Data

Jan. 27, 1987 [JP] Japan .................... 62-16386

[51] Int. Cl.⁵ ............................................. H04R 5/00
[52] U.S. Cl. ..................................... 84/600; 84/622; 84/626; 84/DIG. 1; 84/DIG. 26; 381/1; 381/18
[58] Field of Search ................ 84/DIG. 1, DIG. 26, 84/DIG. 27, 630, 626, 622, 659, 662, 692, 701, 707; 381/18-23, 24, 63, 118, 1

[56] References Cited

U.S. PATENT DOCUMENTS

| | | | |
|---|---|---|---|
| 4,188,504 | 2/1980 | Kasuga et al. | 381/17 |
| 4,219,880 | 8/1980 | Nichols | 381/63 X |
| 4,251,688 | 2/1981 | Furner | 381/19 X |
| 4,332,979 | 6/1982 | Fischer | 381/18 |
| 4,338,581 | 7/1982 | Morgan | 84/DIG. 26 X |
| 4,385,814 | 5/1983 | Elliott | 352/20 |
| 4,638,506 | 1/1987 | Han | 381/63 X |
| 4,696,036 | 9/1987 | Julstrom | 381/22 |
| 4,704,728 | 11/1987 | Scheiber | 381/22 |
| 4,731,848 | 3/1988 | Kendall et al. | 84/DIG. 26 X |
| 4,807,217 | 2/1989 | Ide | 381/20 X |
| 4,815,133 | 3/1989 | Hibino | 381/24 |
| 4,817,149 | 3/1989 | Myers | 381/1 |
| 4,856,064 | 8/1989 | Iwamatsu | 381/18 X |
| 4,862,502 | 8/1989 | Griesinger | 381/22 |
| 4,905,283 | 2/1990 | Ishikawa et al. | 381/22 |
| 4,933,768 | 6/1990 | Ishikawa et al. | 381/18 X |
| 4,937,875 | 6/1990 | Hayashi | 381/63 |

FOREIGN PATENT DOCUMENTS

| | | | |
|---|---|---|---|
| 0090902 | 8/1978 | Japan | 381/61 |
| 0161800 | 12/1981 | Japan | 381/24 |

OTHER PUBLICATIONS

Gerzon, M.A., "Multi-System Ambisonic Decoder", Wireless World, Jul. 1977, pp. 43-47.
"You're in the Action with Surround Sound," Popular Science, p. 89, Sep. 1986.
Heller, D. "Surround-Sound Decoders-3," Wireless World, vol. 82, No. 1488, pp. 57-59, Aug. 1976.
Heller, D., "Surround-Sound Decoders-4," Wireless World, vol. 82, No. 1489, pp. 53-56, Sep. 1976.

Primary Examiner—A. T. Grimley
Assistant Examiner—Matthew S. Smith
Attorney, Agent, or Firm—Spensley Horn Jubas & Lubitz

[57] ABSTRACT

A sound field control device is capable of producing a sound field effect tone which has a tonal effect providing a listener with a feeling of presence and includes a sound field effect tone generation circuit for generating a sound field effect tone on the basis of sound field information supplied from a source. The sound field effect tone is sounded simultaneously with reproduction of the source signal and a reproduced sound field produced on the basis of the source signal is controlled by this sound field effect tone. In one aspect of the invention, the sound field effect tone generation circuit includes a convolution operation circuit which subjects a signal derived from left and right signals from the source signal to convolution operation with sound field data derived on the basis of the sound field information from the source signal.

11 Claims, 7 Drawing Sheets

| MUSICAL SCENE | ROCK MUSIC | JAZZ MUSIC | CLASSICAL MUSIC |
|---|---|---|---|
| SET SOUND FIELD | #4 | #3 | #1 |

TIME →

FIG. 6

| No. | PROGRAM | PARAMETER | DECREASE ← PRESET VALUE → INCREASE | | | CONTENTS OF CONTROL |
|---|---|---|---|---|---|---|
| 1 | HALL | ROOM SIZE | 0.1 | 1.2 | 8.0 | SIMULATE ROOM SIZE, THE LARGER VALUE, THE LARGER SPACE |
| | | LIVENESS | 0 | 5 | 10 | DECAY CHARACTERISTICS OF INITIAL REFLECTED SOUND. THE LARGER VALUE, THE MORE LIVENESS |
| | A. | INIT DLY | 5ms | 30ms | 150ms | TIME UNTIL START OF DELAYED TONE |
| | | HPF | — | THRU | 32Hz∼1.0kHz | LOW CUT-OFF FREQ.  −6dB oct |
| | B. | LPF | 1.0kHz∼ | 5kHz | ∼16kHz, THRU | HIGH CUT-OFF FREQ.  −6dB oct |
| | | REV TIME | 0.3 | 1.8 s | 8.6 | TIME LENGTH OF REVERBERATION |
| | | HIGH | 0.1 | 0.7 | 1.0 | RATIO OF DECAY TIME IN HIGH FREQ. REGION, THE LARGER VALUE, THE MORE LIVENESS |
| 2 | CHURCH | INIT DLY | 5 | 20ms | 150 | |
| | | HPF | — | THRU | 32Hz∼1.0kHz | |
| | | LPF | 1.0kHz∼ | 8.0kHz | ∼16kHz, THRU | |
| 3 | JAZZ CLUB | ROOM SIZE | 0.1 | 1.0 | 8.0 | |
| | | LIVENESS | 0 | 5 | 10 | |
| | | INIT DLY | 5ms | 10ms | 150ms | |
| | | HPF | — | THRU | 32kHz∼1.0kHz | |
| | | LPF | 1.0∼16kHz | THRU | — | |
| 4 | ROCK CONCERT | ROOM SIZE | 0.1 | 1.0 | 8.0 | |
| | | LIVENESS | 0 | 9 | 10 | |
| | | INIT DLY | 5ms | 13ms | 150ms | |
| | | HPF | — | THRU | 33Hz∼1.0kHz | |
| | | LPF | 1.0∼16kHz | THRU | — | |

FIG. 5A

| | | | | | |
|---|---|---|---|---|---|
| 5 | DISCO | ROOM SIZE | 0.1 | 0.3 | 8.0 |
| | | LIVENESS | 0 | 8 | 10 |
| | | INIT DLY | 5 | 8ms | 150 |
| | | HPF | — | THRU | 32Hz~1.0kHz |
| | | LPF | 1.0~16kHz | THRU | — |
| 6 | PAVILION | REV TIME | 0.3 | 0.7s | 8.6 |
| | | HIGH | 0.1 | 0.6 | 1.0 |
| | | INIT DLY | 5 | 80ms | 150 |
| | | HPF | — | THRU | 32Hz~1.0kHz |
| | | LPF | 1.0kHz~ | 6.3kHz | ~16kHz,THRU |
| 7 | PRESENCE | FL DLY | 0.1 | 20.0ms | 600.0 | FRONT Lch, TIME UNTIL START OF DELAYED TONE |
| | | FR DLY | 0.1 | 28.0ms | 600.0 | FRONT Rch, TIME UNTIL START OF DELAYED TONE |
| | | RL DLY | 0.1 | 24.0ms | 600.0 | REAR Lch, TIME UNTIL START OF DELAYED TONE |
| | | RR DLY | 0.1 | 36.0ms | 600.0 | REAR Rch, TIME UNTIL START OF DELAYED TONE |
| | | HPF | — | THRU | 32Hz~1.0kHz |
| | | LPF | 1.0kHz | 8.0kHz | ~16kHz,THRU |
| 8 | SURROUND | ROOM SIZE | 0.1 | 1.0 | 8.0 |
| | | LIVENESS | 0 | 5 | 10 |
| | | INIT DLY | 5 | 30ms | 150 |
| | | HPF | — | THRU | 32Hz~1.0kHz |
| | | LPF | 1.0kHz | 8.0kHz | ~16kHz,THRU |

SOUND FIELD CONTROL DEVICE

This is a continuation of copending application Ser. No. 07/147,707 filed on Jan. 25, 1988, now abandoned.

BACKGROUND OF THE INVENTION

This invention relates to a sound field control device capable of producing a tone having a tonal effect (hereinafter referred to as "sound field effect tone") which provides a listener with a feeling of presence as if he was listening to the music in a different sound field such as a spacious concert hall, church or stadium notwithstanding the fact that he is actually in an ordinary room or listening room. More particularly, this invention relates to a sound field control device of this type capable of automatically establishing a sound field which is most suited to a musical scene or video scene reproduced.

For realizing a feeling of presence of a different sound field such as a concert hall in an ordinary listening room or the like place, auxiliary loudspeakers are disposed around a listener in addition to ordinary main loudspeakers and sound field tones such as reverberating tones and rear tones of source signals are sounded from these auxiliary loudspeakers.

There are prior art sound field control devices which produce sound field effect tones by utilizing sound field effect tone components contained in source signals Another type of prior art sound field control device creates new sound field effect tones without depending upon sound field effect tone components contained in source signals.

As an example of the former type of prior art sound field control device, there is a device which extracts reverberation components after subjecting signals of left and right channels to subtraction between them and subjects the extracted reverberation components to processings such as reinforcement, delay and phase-shifting to produce sound field effect tones. As another example of the former type of prior art sound field control device, there is a device called a 4-channel system which transfers tones of 4 channels, i.e., front left and right tones and rear left and right tones, in a transmission system of 2 channels by encoding these tones into tones of 2 channels by the employment of a discrete system or matrix system and thereafter decoding these tones into 4-channel tones in the playback device.

As an example of the latter type of prior art sound field control device, there is a device which creates reverberation tones artificially by applying source signals to a reverberator.

In the prior art sound field control device utilizing sound field effect tone components contained in source signals, the tonal effect obtained is limited due to limited capacity of the transmission system such as a record and tape. Besides, the tonal effect is a fixed one and the listener cannot adjust the effect as he desires.

In the prior art sound field control device which creates new sound field effect tones without depending upon sound field effect tone components contained in source signals, a greater tonal effect can be obtained since sound field effect tones can be produced irrespective of reverberation components contained in source signals and, also the listener can adjust the tonal effect in various manners. In this latter device, however, the listener must adjust parameters such as room size, liveness, reverberation time and reverberation level each time he wants to obtain a feeling of presence suitable for a reproduced music scene or video scene. This involves a somewhat troublesome adjusting operation.

It is, therefore, an object of the invention to provide a sound field control device of the type creating new sound field effect tones without depending upon sound field effect tones contained in source signals which is capable of automatically setting a sound field most suited to a reproduced musical scene or video scene.

SUMMARY OF THE INVENTION

For achieving the above described object of the invention, it is a feature of the invention to comprise means for automatically generating a sound field effect tone for a certain source on the basis of information supplied from the source for generating the sound field effect tone. This information is not the sound field effect tone itself but information used for generating it and will be referred to as "sound field information" below.

The sound field control device according to the invention comprises sound field effect tone generation means for generating a sound field effect tone on the basis of sound field information supplied from a source, such that the sound field effect tone is sounded simultaneously with reproduction of the source signal, and a reproduced sound field produced on the basis of the source signal is controlled.

According to the invention, sound field information which is suited to the music scene or video scene of the source signal is supplied from its source and the sound field control device can automatically generate a sound field effect tone suited to this sound field and, accordingly, the listener can obtain a feeling of presence of the musical scene or video scene without being bothered with adjusting parameters.

If data for generating various sound field effect tones (hereinafter referred to as "sound field data") are provided on the side of the sound field control device, then sound field information supplied from the source needs only to be information for selecting one of these sound field data. If, in addition to such sound field data provided on the side of the sound field control device, parameters such as room liveness, initial delay time, reverberation time reverberation level of each such sound field d can be changed as desired, then information for one of the sound field effect data and information changing a part or all of the parameters of the sound field data are supplied. In a case where field data itself is supplied as sound field info in accordance with the music scene or video, various sound field data need not be prepared on the of the sound field control device if the sound control device utilizes this sound field data a sound field effect tone.

Thus, a program of "sound field data" consists of the values assigned to various parameters necessary to generate an effect tone emulating a particular sound field. Sound field data can be incorporated in a sound field processor or provided by a source. Information provided by a source as sound field data or as a basis for selecting a program of sound field data incorporated in a sound field processor or for changing a parameter of selected sound field data is referred to as "sound field information.

A preferred embodiment of the will now be described with reference to the accompanying drawings.

BRIEF DESCRIPTION OF THE DRAWINGS

In the accompanying drawings.

DESCRIPTION OF PREFERRED EMBODIMENTS

Figure 1:
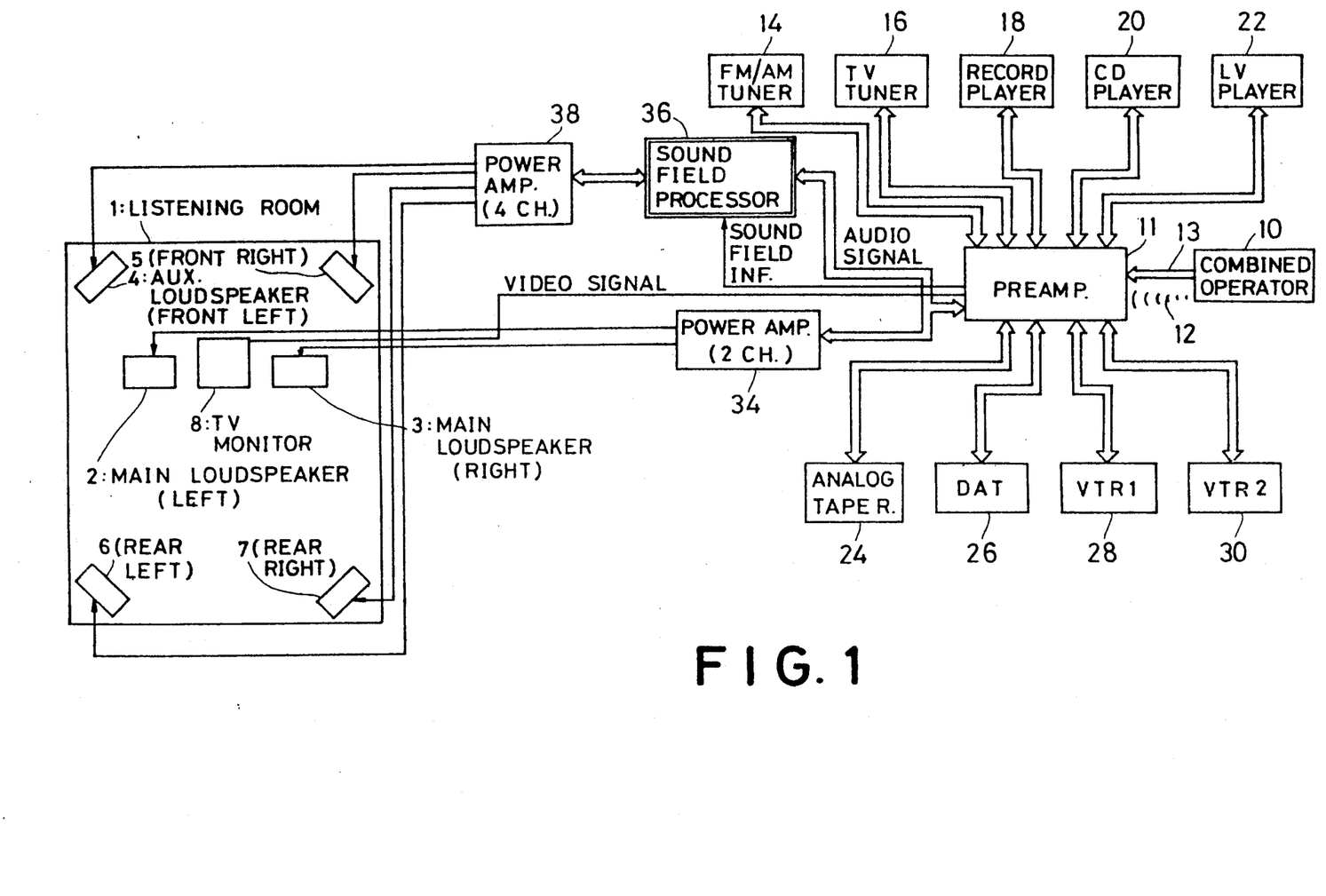
FIG. 1 is a block diagram showing an embodiment of the invention.

FIG. 1 shows an embodiment of the invention.

In FIG. 1, there are provided a listening room 1 two main loudspeakers 2 and 3 d in the center, four loudspeakers 4–7 for sound field effect tones disposed at four (hereinafter referred to as "auxiliary loudspeakers") and a television monitor 8 dispose the main loudspeakers 2 and 3.

To a preamplifier 11 are as source devices, FM/AM tuner 14, tuner 16, record player 18, CD (Compact Disc) 20, VD (video disc player 22, analog audio tape recorder 24, digital audio tape recorder 26 and video tape recorders 28 and 30. From these source devices are supplied reproduced signals and sound field information suited to a music scene or video scene of the reproduced signal. The preamplifier 11 performs functions including selection of one or more of these source devices and adjusting of tone volume of the selected source device in accordance with a command from a combined operator section 10 via wireless means 12 or a wire 13. A video signal among signals supplied from the source devices and selected by the preamplifier 11 is supplied to the television monitor 8. An audio signal is supplied to a 2-channel power amplifier 34 and a sound field processor 36. Sound field information is supplied to the sound field processor 36 for controlling the sound field. The output of the 2-channel power amplifier 34 is supplied to the main loudspeakers 2 and 3.

The sound field processor 36 generates a sound field effect tone on the basis of this invention, i.e., it generates automatically, channel by channel, a sound field effect tone suited to a music scene or video scene of a source signal on the basis of sound field information supplied thereto. The sound field effect tones for the respective channels thus generated are supplied to the auxiliary loudspeakers 4–7 through a power amplifier (four-channel) 38 whereby a sound field suited to the music scene or video scene is automatically produced in the listening room 1.

Contents of sound field information supplied from the source devices can be varied depending upon the manner of setting a sound field in the sound field processor 36. In a case where various sound field data are prepared in the sound field processor 36, information for selecting one of these data, or this selection information and information for changing a part or whole of parameters of the selected sound field data are supplied. In a case where sound field data is not prepared in the sound field processor 36, sound field data itself is supplied in accordance with the music scene or video scene. In this case, the sound field processor 36 once holds the supplied sound field data to produce the sound field effect tone.

(1) In the case of CD and DAT

Sound field information can be recorded for each piece of music in a sub-code region (over the entire piece of music or between pieces of music) and supplied in this recorded form. In the case of CD, sound field information can also be recorded at the start position on the disc as an index. In the latter case, sound field information can be recorded with a music number or address in a pair so that the information is provided upon reaching this music number or address.

(2) In the case of VDP (Video Disc Player)

Sound field information can be recorded by utilizing its control code region for vertical retrace blanking portion or a sub-code region in case of reproduction with digital audio.

(3) In the case of tapes or records recorded in analog audio signals and TV, FM or AM broadcasting with analog signals.

Sound field information can be recorded or broadcast as multiplexed data on audio signals. By recording or broadcasting, for example, a signal with a subcarrier modulated by sound field information using amplitude modulation, frequency modulation or phase modulation in the same manner as in the bilingual TV broadcasting, a conventional playback system can be utilized for reproducing the sound field information.

(4) In the case of TV or FM broadcasting with a digital signal.

Since signals are digitalized, sound field information can be readily inserted in a gap between main signals and transmitted in this form.

Specific example of the sound field processor 36

As the sound field processor 36, as described above, there are various types including one which has sound field data of various sound fields incorporated therein and selects one of the sound field data in response to sound field information applied from a source device to produce a sound field effect tone, one which can change parameters of selected sound field data, and one which has no sound field data in itself but receives sound field data suited to each musical scene or video scene supplied from a source device to produce a sound field effect tone. Description will now be made with respect to each of these types of sound field processors.

(1) The type which selects one of incorporated sound field data in response to sound field information.

Figure 2:
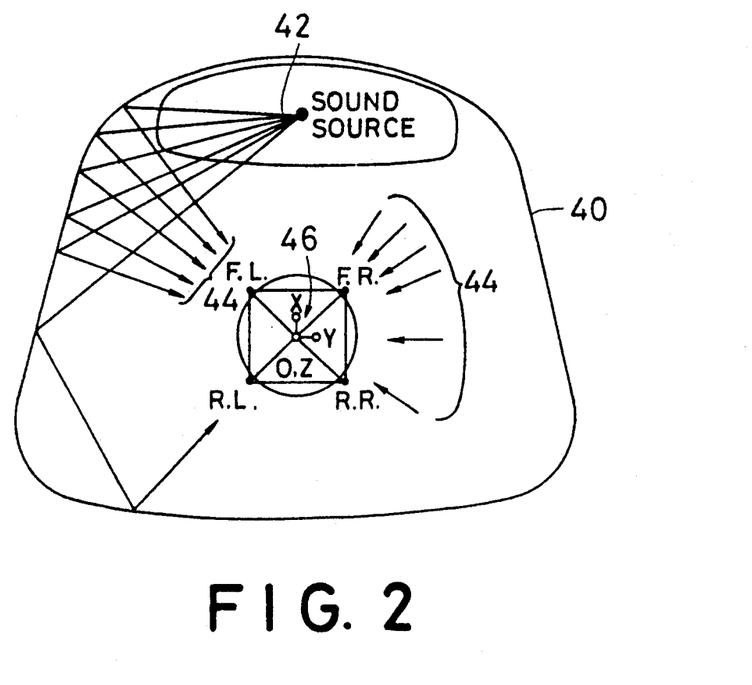
FIG. 2 is a plan view showing a method for measuring hypothetical sound distribution in a sound field such as an actual concert hall.
Figure 3:
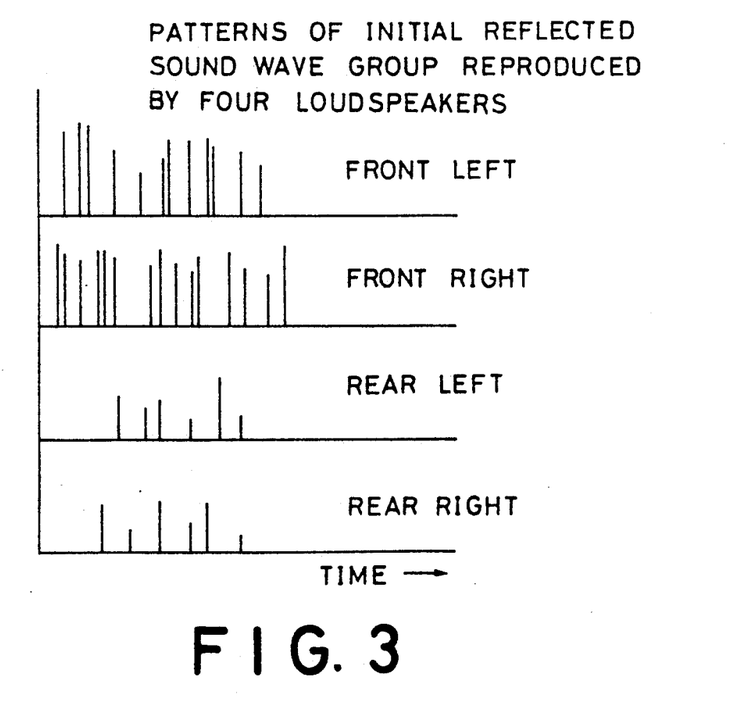
FIG. 3 is a graph showing an example of sound field data used in a case where a effect tone is reproduced from 4 auxiliary loudspeakers in a reproduction space.

As this type of sound field processor 36, the LSI chip YM 3804 mounted on the device called DSP-1 of YAMAHA CORPORATION in Japan utilizing the technique described in Japanese Preliminary Patent Publication No. 257099/1986 may be employed. This simulates sound field spaces such as an actual concert hall etc. The basic principle of this device is illustrated in FIG. 2. Referring now to FIG. 2, an impulse response signal 42 is issued in each of various sound field spaces 40 such as an actual concert hall, church and stadium. Initial reflected sound wave group 44 arriving in all directions to a listening point is caught by a four-point microphone 46 and a hypothetical tone source distribution in this sound field space 40 is obtained from each microphone output. Then, initial reflected sound data necessary simulating this hypothetical tone source distribution in a reproduction space such as the listening room 1 of FIG. 1 through the auxiliary loudspeakers 4-7 are obtained as sound field data with respect to each direction of the auxiliary loudspeakers 4-7 as shown in FIG. 3 and stored in a memory (e.g., in the case of using four auxiliary loudspeakers as in FIG. 1, 22 processed reflected sound data for each auxiliary loudspeaker, i.e., 88 data in all, are stored). These sound field data are read out from the memory during reproduction in the listening room 1 and processed with the source signal, and the processed source signals are sounded from the auxiliary loudspeakers 4-7 whereby various sound field spaces can be reproduced in the listening room 1.

Figure 4:
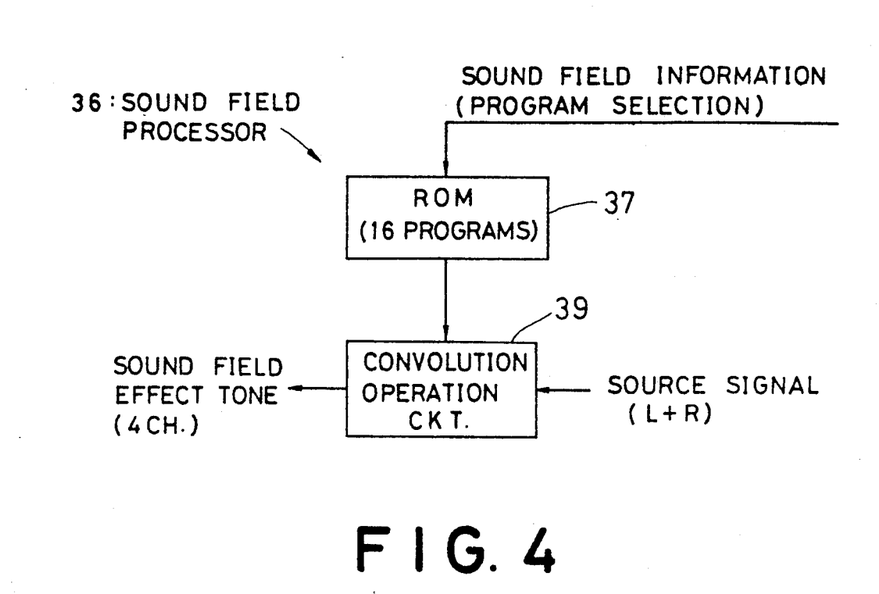
FIG. 4 is a block diagram showing a specific example of sound field processor 36 in FIG. 1.
Figure 5A:
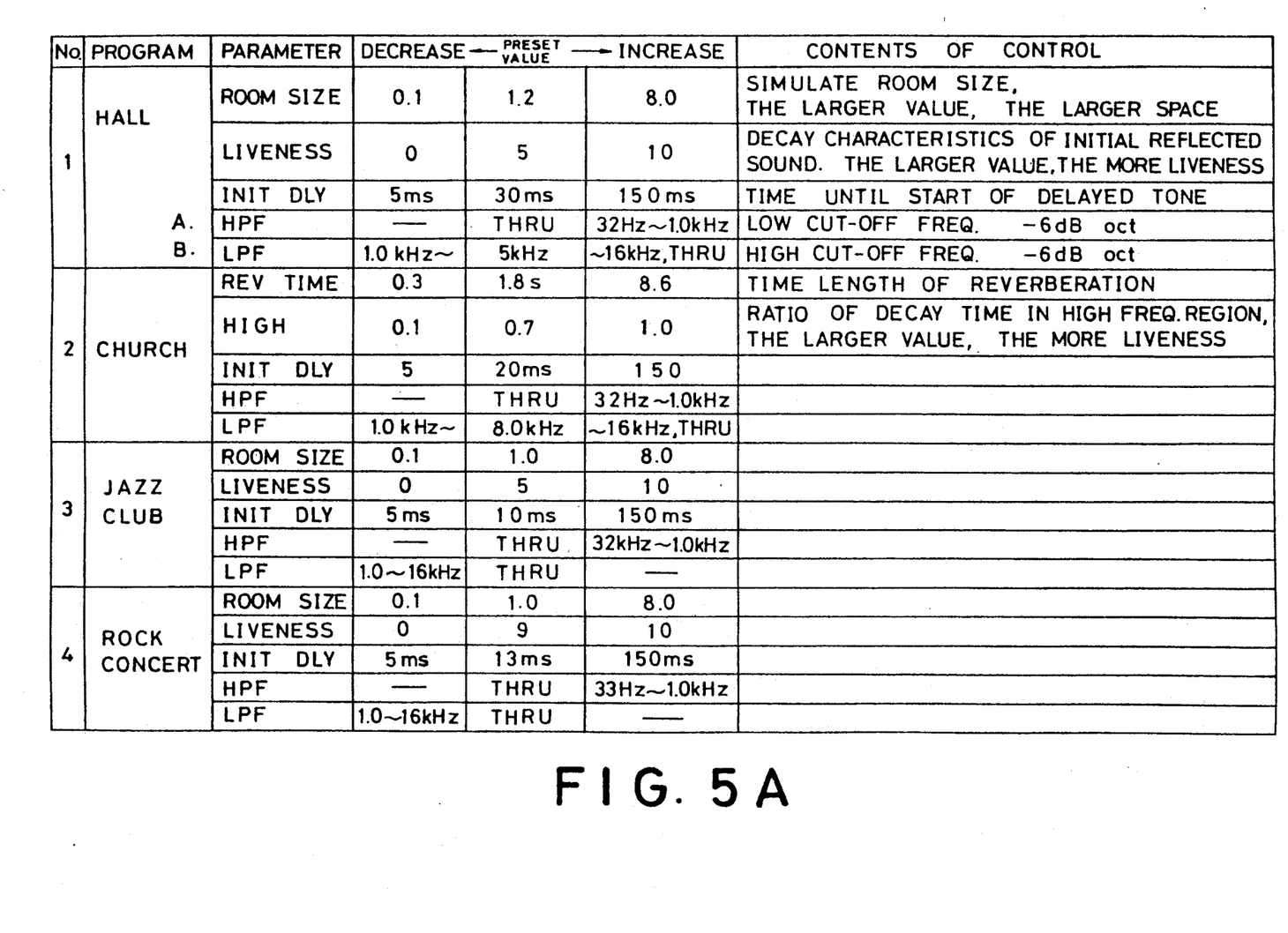
FIGS. 5A and 5B are diagrams showing a part of a factory program for imparting sound field effects stored in LSI chip called YM 3804 on a sound field processor DSP-1 manufactured by YAMAHA CORPORATION in Japan.
Figure 5B:
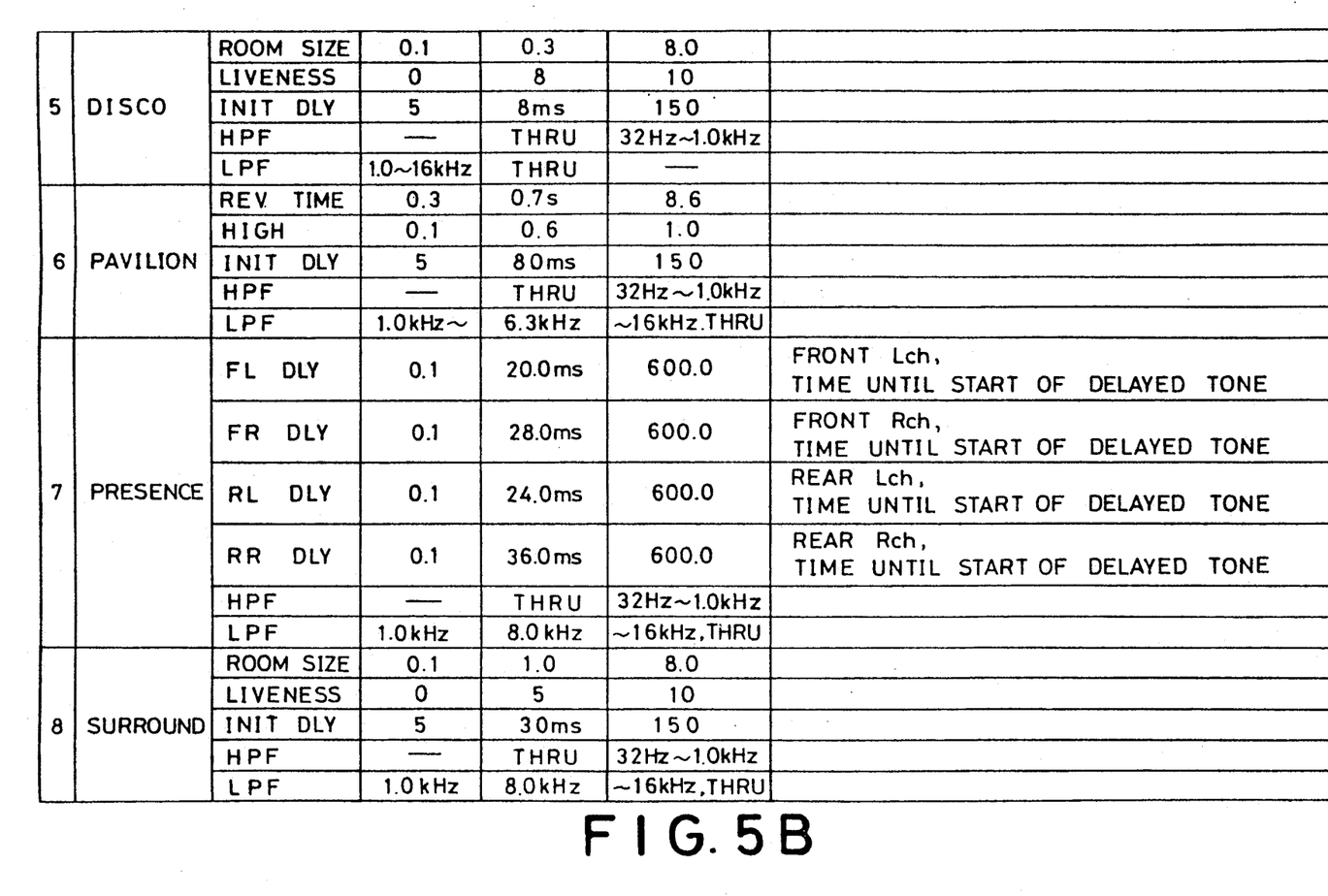

In the LSI chip YM 3804, as shown in FIG. 4, sixteen different factory programs (a part thereof is shown in FIGS. 5A and 5B) are stored in a ROM 37 and 4-channel sound field data of any program is selected in accordance with sound field information supplied from the source device in accordance with the musical scene or video scene. The selected 4-channel sound field data is subjected to digital convolution operation with (L+R) signal or (L−R) signal of a source signals L and R in a convolution operation circuit 39 thereby to produce a sound field effect tone to be supplied to the auxiliary loudspeakers 4-7 of the respective channels.

Figure 6:
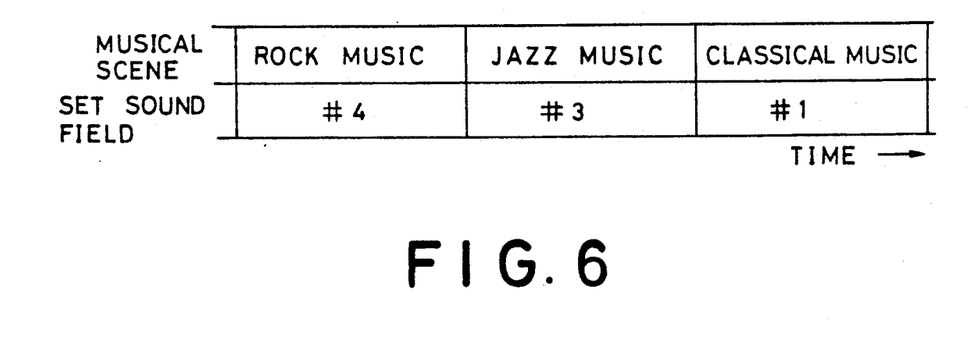
FIG. 6 is a diagram showing an example of sound field control by the sound field control device of FIG. 1.

In the foregoing manner, a sound field in accordance with a reproduced music scene or video scene is automatically reproduced in the listening room 1. If, for example, rock music is reproduced as shown in FIG. 6, the sound field is set to the program 4 "ROCK CONCERT" (FIG. 5A). Likewise, if a jazz is selected, the sound field is set to the program 3 "JAZZ CLUB" (FIG. 5A) and if a classical music is selected, the sound field is set to the program 1 "HALL" (FIG. 5A). In the case of a video scene, the sound field is automatically set to each of the selected video scenes such as a spacious room, a narrow room, a room with rich reverberation, an outer field having an echo effect or a crossing in the street surrounded by buildings.

(2) The type which can change parameters of selected sound field data.

In the DSP-1 incorporating the LSI chip YM 3804, preset values of respective parameters of sound field data can be changed to suitable values, e.g., one shown in FIGS. 5A and 5B. By supplying sound field information for changing these parameter preset values with sound field information for selecting the sound field, the sound field can be changed to more suitable one in accordance with the music scene or video scene.

Figure 7:
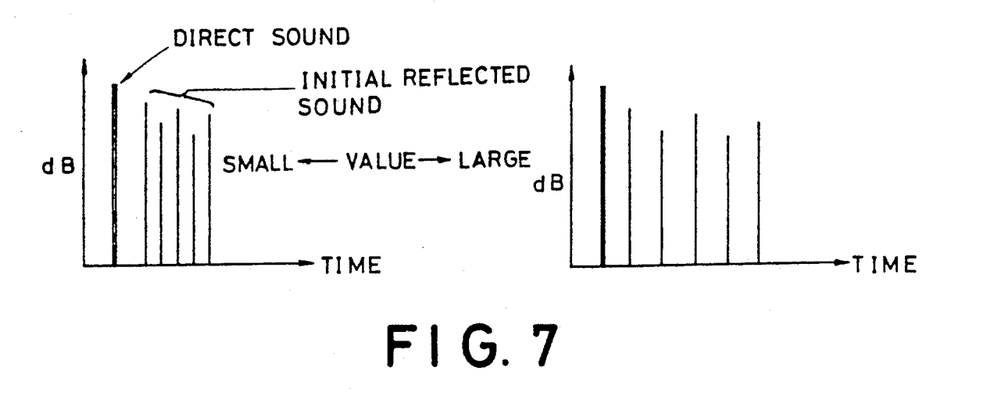
FIGS. 7 through 11 are graphs explaining change in parameters of sound field data.

The parameters which can be changed in the DSP-1 are as follows:

1. Room size (FIG. 7)

This is a parameter for simulating the size of a room. The preset value can be changed within the range between 0.1 and 8.0 with 1 being at the center. The greater the figure, the larger is the space which can be simulated.

Figure 8:
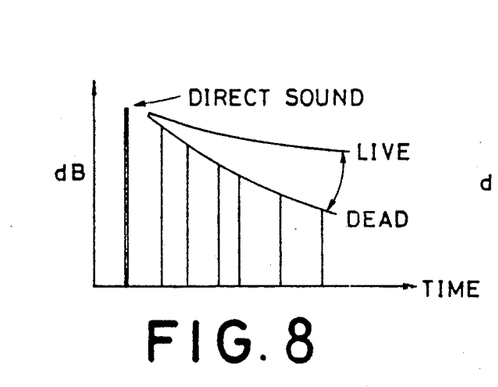

2. Liveness (FIG. 8)

This is a parameter representing the rate of attenuation of initial reflected sound. The greater the figure, the more reflected sound waves the reproduced tone possesses so that the reproduced tone has more liveness whereas the smaller the figure, the less reflected sound waves the reproduced tone possesses so that the reproduced tone becomes more dead.

Figure 9:
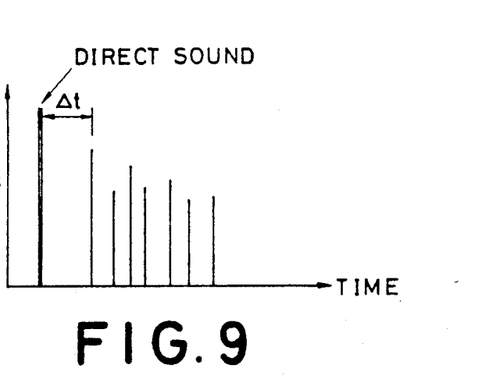

3. Initial delay (FIG. 9)

This is the time length between a time when the direct sound is radiated and a time when the reflected sound starts to be sounded. This time can be changed within the range of between 5 msec and 150 msec. By changing the initial delay, the distance between a listening point and a sound image on the stage can be controlled.

4. Low-pass filter

This is a filter for equalizing higher frequencies with −6 dB/oct in 26 steps within the range of 1 kHz and 16 kHz.

5. High-pass filter

This is a filter for equalizing low frequencies within the range of 32 Hz and 1 kHz in 32 steps with 6 dB/oct.

Figure 10:
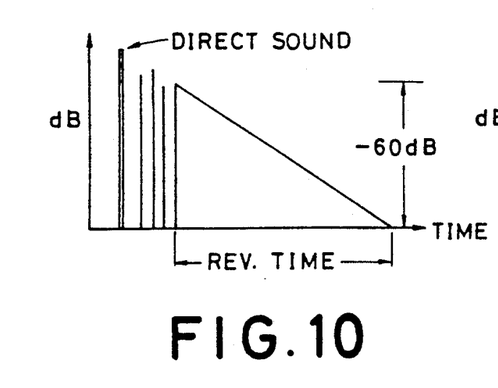

6. Reverberation time (FIG. 10)

This is the time required for attenuation of rear reverberation of middle frequencies to −60 dB. This time can be changed within the range between 0.3 sec and 8.6 sec.

Figure 11:
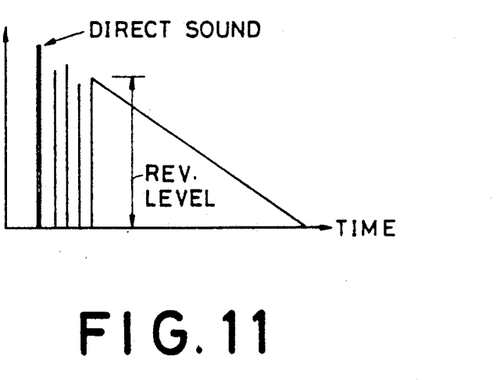

7. Reverberation level (FIG. 11)

This parameter represents the level of the rear reverberation. The greater the figure, the stronger is the reverberation tone.

In addition to the above functions, the DSP-1 system has the following modes as sound effect functions, and parameters of these functions can also be set and controlled as desired;

(a) DELAY

Delay times of the auxiliary loudspeakers can be changed.

(b) STEREO ECHO

This is a stereophonic style mode brought about by using two delay units. Different delay times and different feedback gains can be imparted to the left and right channels. Also, phases of opposite polarities can be combined in fine details. A natural echo can be simulated finely and actively while imparting an impression of large space to the listener.

(c) MODULATION

This is an effect of bringing about change in the tone color due to phase interference between tones by adding tones of slightly different delay times together. The tone color can also be changed with the lapse of time by modulating the delay time or the level of the delayed tone with a low frequency.

(d) PITCH CHANGE

This is a program for changing the pitch (note interval) of voice or musical instrument in real time. The pitch can be changed by semitone within the range of ±one (1) octave. The pitch may be finely changed also in unit of one cent (=1/100 semitone).

It is also possible to set pitches of two tones and produce a chord by mixing them with the direct sound. If the pitch change is small (e.g., about 10 cents), a chorus effect can be obtained. By adjusting feedback gain and delay time, an echo effect with pitch change can be produced.

(e) PAN

By manipulating a knob of a pan pot attached to a mixer, a sound image is moved to the left or to the right. PAN is a program for automatically performing this operation. The manual operation of the knob tends to cause irregularity in the movement of the sound image whereas this PAN program can control the speed and direction of movement of the sound image as accurately as they are initially set so that the sound image can be moved periodically and stereophonically between the left and right channels or the four channels.

Figure 12:
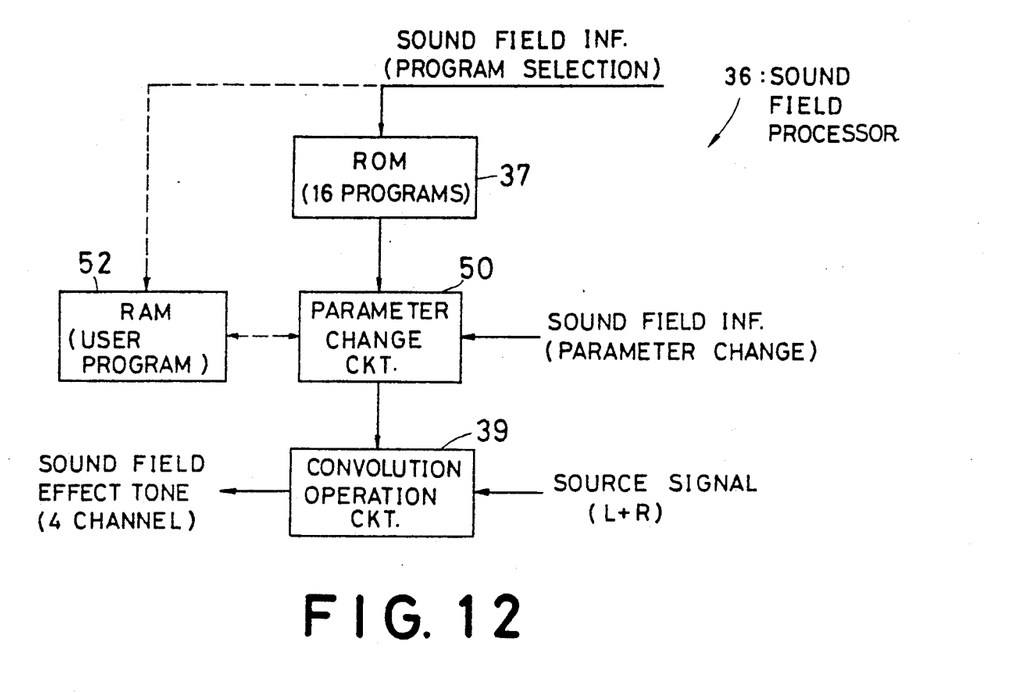
FIGS. 12 and 13 are block diagrams showing other examples of the sound field process 36 in FIG. 1.

FIG. 12 shows an example of the sound field processor 36 in which the parameter preset values of selected sound field data can be changed. Sixteen factory programs, a part of which is shown in FIG. 5, are stored in a ROM 37, and 4-channel sound field data of one of the programs is selected in response to sound field information supplied in accordance with a music scene or video scene from the source device. This selected sound field data is changed in its parameters in a parameter change circuit 50 in response to sound field information designating change of parameters. The changed parameters are subjected to convolution operation with the (L+R) signal or (L−R) signal of the source signals L and R in the convolution operation circuit 39 to produce a sound field effect tone to be supplied to the respective auxiliary loudspeakers 4-7.

If changed programs are stored in a RAM 52 as a user program (the DSP-1 system can store sixteen user programs obtained by changing the factory programs), it will suffice if information for selecting one of the user programs is supplied as sound field information.

(3) The type which produces sound filed data itself as sound field information

Figure 13:
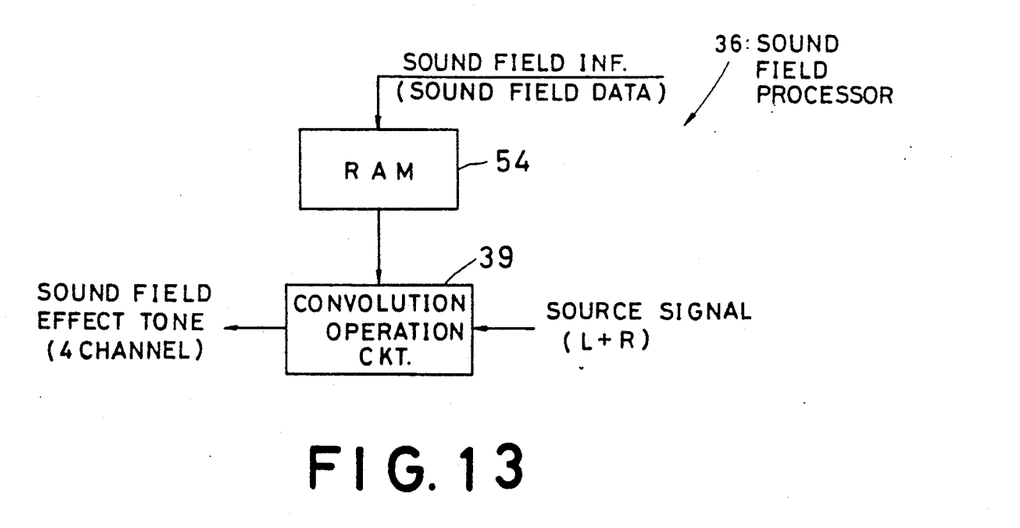

If sound field data itself according to the music scene or video scene is supplied from the source device as sound field information, it will be unnecessary for the sound filed processor 36 to have its own program of sound field data. FIG. 13 shows an example of such sound field processor. The 4-channel sound filed data supplied from the source device is once held in a RAM 54 and then is subjected to convolution operation with the (L+R) signal or (L−R) signal of the source signals L and R in the convolution operation circuit 39 to produce a sound field effect tone to be supplied to the auxiliary loudspeakers 4-7 of the respective channels. The RAM 54 is rewritten each time new sound filed data is supplied thereto.

In the embodiment of FIG. 1, the sound field processor 36 is provided separately from the preamplifier 11. The preamplifier may however be incorporated in the sound field processor 36.

In the above described embodiment, description has been made as to the case where a sound field effect tone is produced on the basis of data simulating actual sound field space. The invention is also applicable to sound filed control devices which create new sound field effect tones without depending upon sound field effect tones contained in source signals as by the conventional reverberators.

In the above described embodiment, description has been made as to the case where the sound field effect tone is produced with four channels. The invention is also applicable to a sound field control device which produces a sound field effect tone with a different number of channels.

What is claimed is:

1. A sound field control device comprising:
   means for receiving from a source a basic audio signal which is to be reproduced and sound field information in addition to and distinct from the audio signal; and
   sound field effect tone generation means for generating a sound field effect tone from the received basic audio signal on the basis of the sound field information, the sound filed effect tone being sounded simultaneously with reproduction of the basic audio signal whereby a reproduced sound field produced on the basis of the basic audio signal is controlled from the source.

2. A sound field control device as defined in claim 1 wherein the audio signal includes left and right signals and wherein said sound field effect tone generation means comprises convolution operation means for subjecting a signal derived from the left and right signals to a convolution operation with sound field data based on the sound field information.

3. A sound field control device as defined in claim 2 wherein the sound field information derived from the source is data for selecting one of plural sound field programs whose sound field data are preset in a memory and sound field data of the selected sound field program is read out from said memory and is subjected to convolution operation with the signal derived from the left and right signal from the audio signal.

4. A sound field control device as defined in claim 3 wherein the sound field information derived from the audio signal further comprises parameter changing data for changing parameters of the selected sound field program and the sound field data read out from said memory is changed in accordance with this parameter changing data and thereafter is subjected to convolution operation with the signal derived from the left and right signals from the audio signal.

5. A sound field control device as defined in claim 4 wherein the changed sound field data is stored in a memory for reutilization thereof.

6. A sound field control device as defined in claim 2 wherein the sound field information derived from the source signal sound field data itself and is directly subjected to convolution operation with the signal derived from the left and right signals from the source signal.

7. A sound field control device as defined in claim 2 wherein the sound field data comprises data for four channels corresponding to positions which are front left, front right, rear left and rear right of a listening position in a room and these data are subjected to convolution operation with the signal derived from the left and right signals of the source signal whereby four sound field effect tones are obtained and sounded from loudspeakers provided at the front left, front right, rear left and rear right positions of the listening position.

8. A sound field control device as defined in claim 2 wherein the sound field information is obtained for each reproduced piece of music.

9. A sound field control device as defined in claim 2 wherein the sound field information is obtained for each scene of reproduced video.

10. A sound field control device as defined in claim 2 wherein the signal derived from the left and right signals from the source signal is a sum signal or a difference signal of the left and right signals.

11. A sound field control device, comprising:
    means for receiving a basic audio signal from a source;
    means for receiving variable control information from the source distinct from the basic audio signal, the control information controlling a sound field effect tone which accompanies a reproduced basic audio signal; and
    means for automatically generating a suitable sound field effect tone on the basis of the control information from the source and the basic audio signal, wherein a new sound field effect tone is automatically generated for each variation in control information.

* * * * *